(12) United States Patent
Ji et al.

(10) Patent No.: US 7,951,510 B2
(45) Date of Patent: May 31, 2011

(54) ELECTROCONDUCTIVE POLYMER COATING ON ELECTROCONDUCTIVE ELEMENTS IN A FUEL CELL

(75) Inventors: Chunxin Ji, Rochester, NY (US); Steven R Falta, Honeoye Falls, NY (US); Thomas A Trabold, Pittsford, NY (US); Brian K Brady, North Chili, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1061 days.

(21) Appl. No.: 10/988,324

(22) Filed: Nov. 11, 2004

(65) Prior Publication Data
US 2006/0099481 A1 May 11, 2006

(51) Int. Cl.
*H01M 8/02* (2006.01)

(52) U.S. Cl. ......... 429/522; 429/518; 429/514; 427/115

(58) Field of Classification Search ........................ None
See application file for complete search history.

(56) References Cited

U.S. PATENT DOCUMENTS

| | | | |
|---|---|---|---|
| 5,342,710 A | | 8/1994 | Koksbang |
| 5,368,959 A | | 11/1994 | Koksbang et al. |
| 5,703,173 A | * | 12/1997 | Koloski et al. ............. 525/326.2 |
| 6,060,410 A | * | 5/2000 | Gillberg-LaForce et al. 442/118 |
| 6,203,936 B1 | * | 3/2001 | Cisar et al. ..................... 429/518 |
| 6,291,094 B1 | * | 9/2001 | Yoshimura et al. ............. 429/34 |
| 6,365,293 B1 | * | 4/2002 | Isono et al. ...................... 429/30 |
| 6,426,161 B1 | * | 7/2002 | Cisar et al. ...................... 429/38 |
| 6,921,598 B2 | | 7/2005 | Yamamoto et al. |
| 2002/0034672 A1 | * | 3/2002 | Saito et al. ...................... 429/34 |
| 2003/0054221 A1 | * | 3/2003 | Saito et al. ...................... 429/34 |
| 2004/0106032 A1 | * | 6/2004 | Uejima et al. .................. 429/34 |

FOREIGN PATENT DOCUMENTS

| | | | |
|---|---|---|---|
| CN | 1416604 | | 5/2003 |
| JP | 58-100368 | * | 12/1981 |
| JP | 2002/008685 | | 1/2002 |
| JP | 2002008685 A | * | 1/2002 |
| JP | 2005/008685 | | 1/2005 |

OTHER PUBLICATIONS

JP 2002-008685, Hayahi, Tatsuya, Jan. 2002, machine translation.*
Camalet, J.L., J.C. Lacroix, et al (1998). "Characterization of polyaniline films electrodespotied on mild steel in aqueous p-toluenesulfonic acid solution." Journal of Electroanalytical Chemistry, 445 (1-2): 117-124.
Grgur, B.N., N. V. Krstaji, et al (1998). "The influence of polypyrrole films on the corrosion behavior of iron in acid sulfate solutions." Progress in Organic Coatings, 33 (1): 1-6.
Iroh, J.O. and Su, W. (1998). "Effects of elecrochemical process parameters on the synthesis and properties of polypyrrole coatings on steel." Synthetic Metals, 95(3): 159-167.

(Continued)

*Primary Examiner* — Dah-Wei D Yuan
*Assistant Examiner* — Maria J Laios

(57) ABSTRACT

A bipolar plate for use in a proton exchange membrane fuel cell having an electrically conductive polymer coated on at least one region of a surface of the plate in contact with a flow field. The coated region is hydrophobic or hydrophilic as compared to an uncoated region of the surface to prevent liquid accumulation. Electroconductive polymer coatings are applied by electrochemical polymerization.

22 Claims, 6 Drawing Sheets

OTHER PUBLICATIONS

Iroh, J.O., Su, W. (2000). "Corrosion performance of polypyrrole coating applied to low carbon steel by an electrochemical process." Electrochimica Acta, 46(1): 15-24.

Krstaji, J.V., B.N. Grgur, et al (1997). "Corrosion protection of mild steel by polypyrrole coatings in acid sulfate solutions." Electrochimica Acta, 42(11): 1685-1691.

Rajagopalan, R. and J.O. Iroh (2001). "Development of polyaniline-polypyrrole composite coatings on steel by aqueous electrochemical process." Electrochimica Acta, 46(16): 2443-2455.

Su, W. and Iroh, J.O. (1999). "Electropolymerization of pyrrole on steel substrate in the presence of oxalic acid and amines." Electrochimica Acta, 44(13): 2173-2184.

Su, W. and Iroh, J.O. (1999). "IR and XPS studies on the interphase and poly(N-methylpyrrole) coatings electrodeposited on steel substrates." Electrochimica Acta, 44(19): 3321-3332.

Su, W. and Iroh, J.O. (1999). "Morphology and structure of the passive interphase formed during aqueous electrodepositin of polypyrrole coatings on steel." Electrochimica Acta, 44(26): 4655-4665.

Su, W. and Iroh, J.O. (2000). "Electrodeposition mechanism, adhesion and corrosion performance of polypyrrole and poly(N-methylpyrrole) coatings on steel substrates." Synthetic Metals, 14(3): 225-234.

Wencheng, S. and Iroh, J.O. (1997). "Formation of polypyrrole coatings on stainless steel in aqueous benzene sulfonate solution." Electrochimica Acta, 42(17):.2685-2694.

Wncheng, S. and Iroh, J.O. (2000). "Electrodeposition mechanism of polypyrrole coatings on steel substrates from aqueous oxalate solutions." Electrochimica Acta, 46(1): 1-8.

Akundy, Gouri Smitha and Iroh, J.O. (2001). "Polypyrrole coatings on aluminum-synthesis and characterization." Polymer, 42: 9665-9669.

Letter from China Patent Agent dated Jul. 2, 2010, referring to First Office Action which cites CN1416604.

* cited by examiner

US 7,951,510 B2

ELECTROCONDUCTIVE POLYMER COATING ON ELECTROCONDUCTIVE ELEMENTS IN A FUEL CELL

FIELD OF THE INVENTION

The present invention relates to fuel cells, and more particularly to the conductive elements in fuel cells.

BACKGROUND OF THE INVENTION

Fuel cells have been proposed as a power source for electric vehicles and other applications. An exemplary fuel cell has a membrane electrode assembly (MEA) with catalytic electrodes and a proton exchange membrane (PEM) sandwiched between the electrodes. Water is generated at the cathode electrode based on the electrochemical reactions between hydrogen and oxygen occurring within the MEA. Efficient operation of a fuel cell depends on the ability to provide effective water management in the system, for example to control transport of water away from generation sites on the cathode to prevent water build up from blocking flow channels and flooding of the fuel cell.

During operation of a fuel cell at low power loads, product water may accumulate in the channels of the reactant flow fields, particularly on the cathode side. Water accumulation may lead to blocked fluid flow (so called "flooding") which potentially leads to instability of a portion of a fuel cell. Various means of circumventing this potential problem have been explored and have included altering the physical characteristics of the channels, specifically the channel geometry, including size and shape. Thus, optimum fuel cell performance relates to efficient water management. Thus, there is a need for improved water management to improve fuel cell performance, efficiency, and life span.

SUMMARY OF THE INVENTION

The present invention provides an electrically conductive element having a surface defining a flow field for use in an electrochemical fuel cell. The element has an electroconductive polymer coating deposited along a region of the surface of the element.

In one aspect, the present invention provides a fuel cell having a membrane electrode assembly (MEA). The fuel cell comprises an impermeable, electrically conductive element defining a fluid flow field and having a surface adjacent to the MEA/gas diffusion media. An electroconductive polymer coating is deposited on a region of the surface susceptible to liquid accumulation. The coating reduces the liquid accumulation along the region as compared to an uncoated surface.

In another aspect, the present invention provides a method for manufacturing an electrically conductive element of an electrochemical fuel cell. The method comprises depositing an electroconductive polymer coating on one or more regions of an electrically conductive surface of the electrically conductive element via electropolymerization or simple solution casting.

In still another aspect, the present invention provides an electroconductive element for use in a fuel cell. The element comprises a surface having a fluid flow field formed therein, and an electroconductive polymer coating applied along a region of the flow field to reduce the liquid accumulation on the coated region as fluid flows through the flow field as compared to an uncoated surface.

In yet another aspect, the present invention provides a method of making an electrically conductive element through electropolymerization for use in a fuel cell. The method includes contacting a region of an electrically conductive surface of the element with an electrolytic solution comprising one or more electroconductive monomer with a desired counter ion electrolyte and applying a first potential to the element and a second and opposite potential to a counter-electrode in contact with the deposition solution. The potential is applied for a duration sufficient to electropolymerize the monomer along the region, thereby forming an electroconductive polymer coating along the region.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
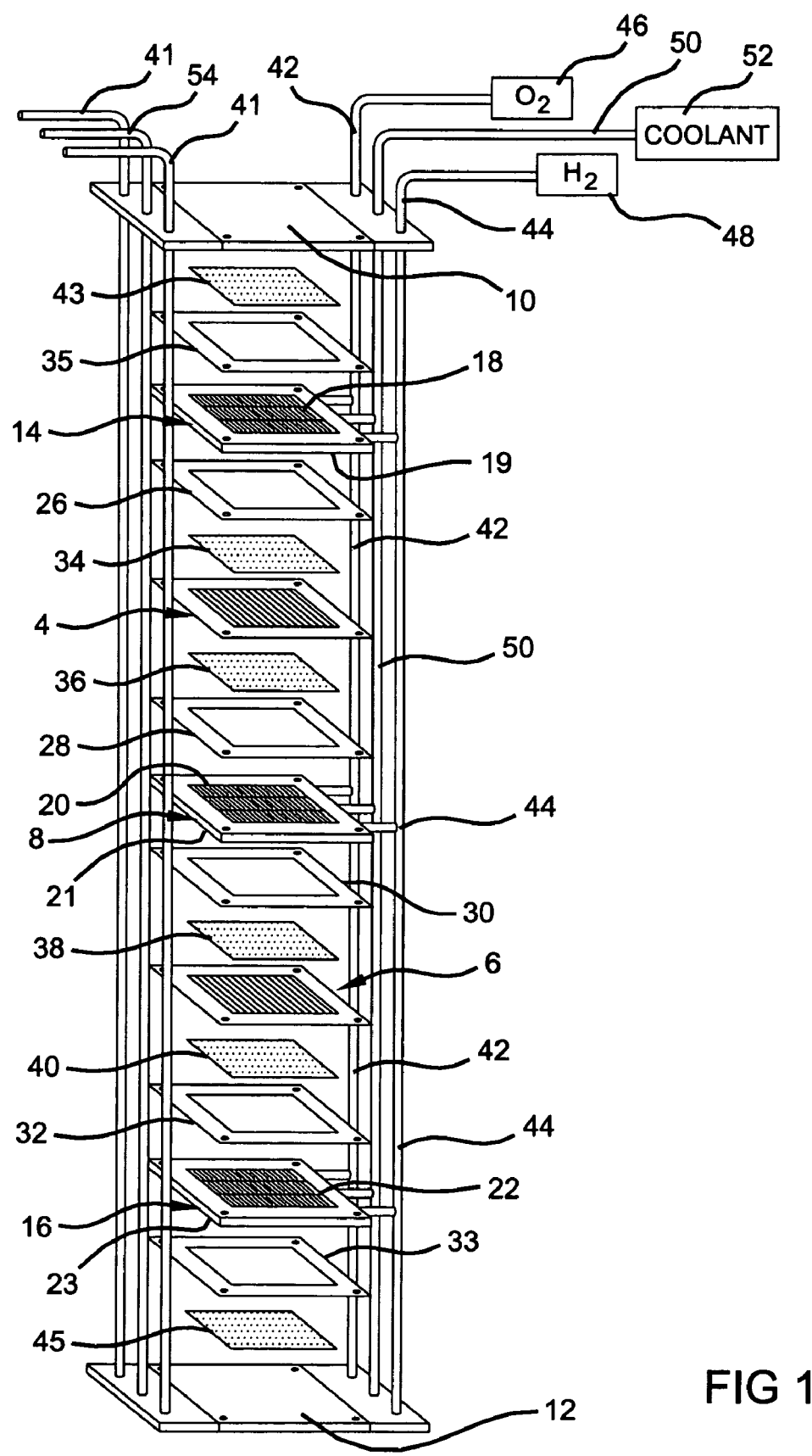
FIG. 1 is a schematic, exploded, isometric, illustration of an exemplary liquid-cooled PEM fuel cell stack (only two cells shown)

The following description of the preferred embodiment(s) is merely exemplary in nature and is in no way intended to limit the invention, its application, or uses.

In order to achieve stable PEM fuel cell operation over a wide range of loads, it is necessary to properly manage fluid flow, and more particularly liquid flow, in a fuel cell. For example, liquid water is produced by the cathodic oxygen reduction reaction which occurs during operation of an electrochemical fuel cell and must be effectively circulated and removed to maintain stable reactions. A key factor related to fuel cell operation is water transportation and preventing undesired accumulation of water in a fuel cell. Thus, the ability to expel water from flow field channels at various levels of gas velocities and operating conditions is important to fuel cell operations. For instance, under low load conditions near $0.1\ A/cm^2$, it has been demonstrated that water accumulation in flow field "U-bends" and curves contributes to low performing cell behavior. This relates to a condition wherein one or more cells within a stack experiences a rapid drop in voltage. In this case, the gas inertia is not sufficient to expel large liquid slugs around 180° bends toward the cathode exhaust header. This potential accumulation may result in entire channels being starved of oxygen. To address such issues, the present invention contemplates a flow field having a fine tuned surface free energy and roughness in conjunction with channel geometry design to improve fuel cell operations by effectively removing water to maintain stable performance at low gas velocities.

Liquid accumulation as described herein is, in essence, a pooling of liquid water formed primarily at the cathode. The conductive polymeric material described herein comprises conjugated electrically conductive polymeric materials that are also referred to as pi bond giving rise to the electrical conductivity. The term "electroconductive" as used herein is a relatively shorthand term used in the field to designate electrically conductive.

The present invention provides an electroconductive element for use in a fuel cell. The element preferably comprises a surface having a fluid flow field formed therein, and an electroconductive polymer coating applied along a region of the flow field. The electroconductive polymer coating according to the present invention reduces liquid accumulation on the coated region as fluid flows through the flow field, as compared to liquid accumulation over an uncoated region of the surface. Some advantages of using electroconductive coatings include: 1.) the coatings are electrically conductive; 2.) the surface free energy (hydrophobic or hydrophilic) of the polymer coatings can be tailored by using different counter ions or deposition conditions; 3.) the conductive polymers, such as polypyrrole and polyaniline, exhibit good corrosion resistance; and 4.) these conductive polymers can be simply applied via electropolymerization or solution casting.

In one embodiment, a hydrophobic coating can be applied to the electroconductive elements. "Hydrophobic" as used herein is a relative material characteristic as compared to a reference material, and more particularly pertains to a surface property where the surface has a diminished propensity to accumulate or attract liquids. Thus, hydrophobic surfaces generally have lower surface free energies, higher surface contact angles, or both, as compared to a reference surface. In this manner, the present invention provides an ability to manipulate the surface properties of the flow field by applying the hydrophobic coating to select regions of the flow field, thereby improving water transport and management, which improves the fuel cell performance, when compared to an element not having the water management hydrophobic coating applied. In preferred embodiments of the present invention, the hydrophobic coating comprises an electroconductive polymer which preferably increases the hydrophobicity (e.g., decreases the surface energy) of the coated region when compared to an uncoated and untreated region of the flow field.

In another embodiment, a hydrophilic coating can be applied to the electroconductive elements. "Hydrophilic" as used herein is a relative material characteristic as compared to a reference material, and more particularly pertains to a surface property where water spreads easily on the surface. Thus, hydrophilic surfaces generally have higher surface free energies, lower surface contact angles, or both, as compared to a reference surface. In this manner, the present invention provides an ability to manipulate the surface properties of the flow field by applying the hydrophilic coating to select regions of the flow field, thereby preventing the formation of water droplets which may plug the gas flow channels. This results in improved fuel cell performance, when compared to an element not having the water management hydrophilic coating applied. In preferred embodiments of the present invention, the hydrophilic coating comprises an electroconductive polymer which preferably increases the hydrophilicity (e.g., increases the surface energy) of the coated region when compared to an uncoated and untreated region of the flow field.

In yet another embodiment, the wettability of a surface can be enhanced by manipulating the roughness of the surface during electropolymerization. This can be accomplished by controlling the voltage and current during application of the coating. In general, a slower deposition process results in smoother surface morphology, which can be achieved by using a low concentration solution, lower deposition overpotential and lower deposition current. In addition, the selection of different counter ions (electrolyte) will also affect surface morphology of the deposited polymer films.

The influence of roughness on wettability depends on whether the substrate surface is hydrophobic or hydrophilic. The wettability of a surface is categorized by the measurement of the contact angle, or the angle formed at the contact line between a drop and a surface. For contact angles less than 90 degrees, a surface is considered hydrophilic, and for those greater than 90 degrees, hydrophobic. Governed by Wenzel's Law, as is known by one skilled in the art, when a surface is roughened, the contact angle, or wettability, is modified. As the roughness is increased, the wettability increases for hydrophilic surfaces, and decreases for hydrophobic surfaces. Conversely, as the surface is made smoother, a hydrophobic surface becomes more wettable, and a hydrophilic surface becomes less wettable. As used herein, the wettability of a liquid is defined as the contact angle between a droplet of liquid in thermal equilibrium on a horizontal surface. The wetting angle of a non-wetting fluid is generally less than 90 degrees. The wetting angle of a wetting fluid is generally between 90 and 180 degrees. Roughness measured with a peak-to-valley ratio on the order of 10 microns is enough to significantly influence surface wettability. By controlling the roughness, the degree of hydrophilicity and hydrophobicity can be enhanced. Therefore, roughness in conjunction with surface energy gives added flexibility in controlling channel water accumulation. By minimizing the roughness and having a smooth and even surface, the coating of the present invention ensures that electrical contact between bipolar plates will be maintained.

The present invention thus provides a method for modifying the surface free energy and changing the hydrophobicity of regions of electroconductive elements (e.g. bipolar plates) by applying an electroconductive polymer onto select regions of the elements. A preferred method of applying the electroconductive polymer according to the present invention is via electropolymerization onto the electroconductive element. Alternatively, these polymer coatings can comprise electroconductive polymers with desired counter ions that are synthesized first, and then applied to the element by solution casting or screen printing via appropriate solvents, as known in the art. Using any appropriate method, the electroconductive polymer is deposited on a region of the surface of the element, for example as a thin film coated on one or more select regions.

The present invention also provides a fuel cell containing an impermeable electrically conductive element having an electroconductive polymer coating along one or more regions. The fuel cell contains the impermeable electrically conductive element defining a fluid flow field, where the flow field is adjacent to a membrane electrode assembly (MEA)/gas diffusion media. At least one region of the surface of the conductive element has the hydrophobic or hydrophilic coating electrodeposited along a region of the flow field susceptible to liquid accumulation.

To gain a better understanding of the present invention, an exemplary fuel cell where the present invention may be employed is shown in FIG. 1, which depicts two individual proton exchange membrane (PEM) fuel cells connected to form a stack having a pair of membrane electrode assemblies (MEAs) 4, 6 and gas diffusion media 34, 36, 38, 40 separated from each other by an electrically conductive, liquid cooled, bipolar separator plate or conductive element 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so called "bipolar" plate. As described herein, the fuel cell stack is described as having conductive bipolar plates.

The MEAs 4, 6 and bipolar plate 8 are stacked together between stainless steel clamping terminal plates 10, 12 and end contact fluid distribution elements 14, 16. The end fluid distribution elements 14, 16, as well as both working faces or sides 20, 21 of the bipolar plate 8, contain a plurality of lands adjacent to grooves or channels on the active faces 18, 19, 20, 21, 22 and 23 for distributing fuel and oxidant gases (i.e, $H_2$ and $O_2$) to the MEAs 4, 6. Nonconductive gaskets or seals 26, 28, 30, 32, 33 and 35 provide seals and electrical insulation between the several components of the fuel cell stack. Gas permeable conductive diffusion media 34, 36, 38 and 40 press up against the electrode faces of the MEAs 4, 6. Additional layers of conductive media 43, 45 are placed between the end contact fluid distribution elements 14, 16 and the terminal collector plates 10, 12 to provide a conductive pathway therebetween when the stack is compressed during normal operating conditions. The end contact fluid distribution elements 14, 16 press up against the diffusion media 34, 43 and 40, 45 respectively.

Oxygen is supplied to the cathode side of the fuel cell stack from storage tank 46 via appropriate supply plumbing 42, while hydrogen is supplied to the anode side of the fuel cell from storage tank 48 via appropriate supply plumbing 44. Alternatively, air may be supplied to cathode side from the ambient, and hydrogen to the anode from a methanol or gasoline reformer or the like. Exhaust plumbing 41 for both the $H_2$—$O_2$/air sides of the MEAs is also provided. Additional plumbing 50 is provided for circulating coolant from a storage area 52 through the bipolar plate 8 and end plates 14, 16 and out the exit plumbing 54.

During fuel cell operation, the anode hydrogen gas ($H_2$) is split into two protons (H+), thus freeing two electrons. The protons migrate across the membrane of the MEA 4, 6 to the cathode side. The oxygen or air introduced at the cathode side flows into the porous electrode. Catalyst particles within the cathode facilitate a reaction between the protons ($H^+$) and oxygen ($O_2$), to form water within the electrode. Thus, as liquid water is generated, the gas flow into the porous cathode material must simultaneously be maintained. Otherwise the electrode has the potential to "flood" with liquid. Flooding impedes gas flow to the PEM through the MEA 4, 6 in effect decreasing or ceasing any reactions occurring at the MEA 4, 6. A preferred embodiment of the present invention provides the fluid distribution means adjacent to the cathode that facilitates water and cathode effluent transportation away from the cathode, while further humidifying the PEM, and in some embodiments, even cooling the fuel cell.

Figure 2:
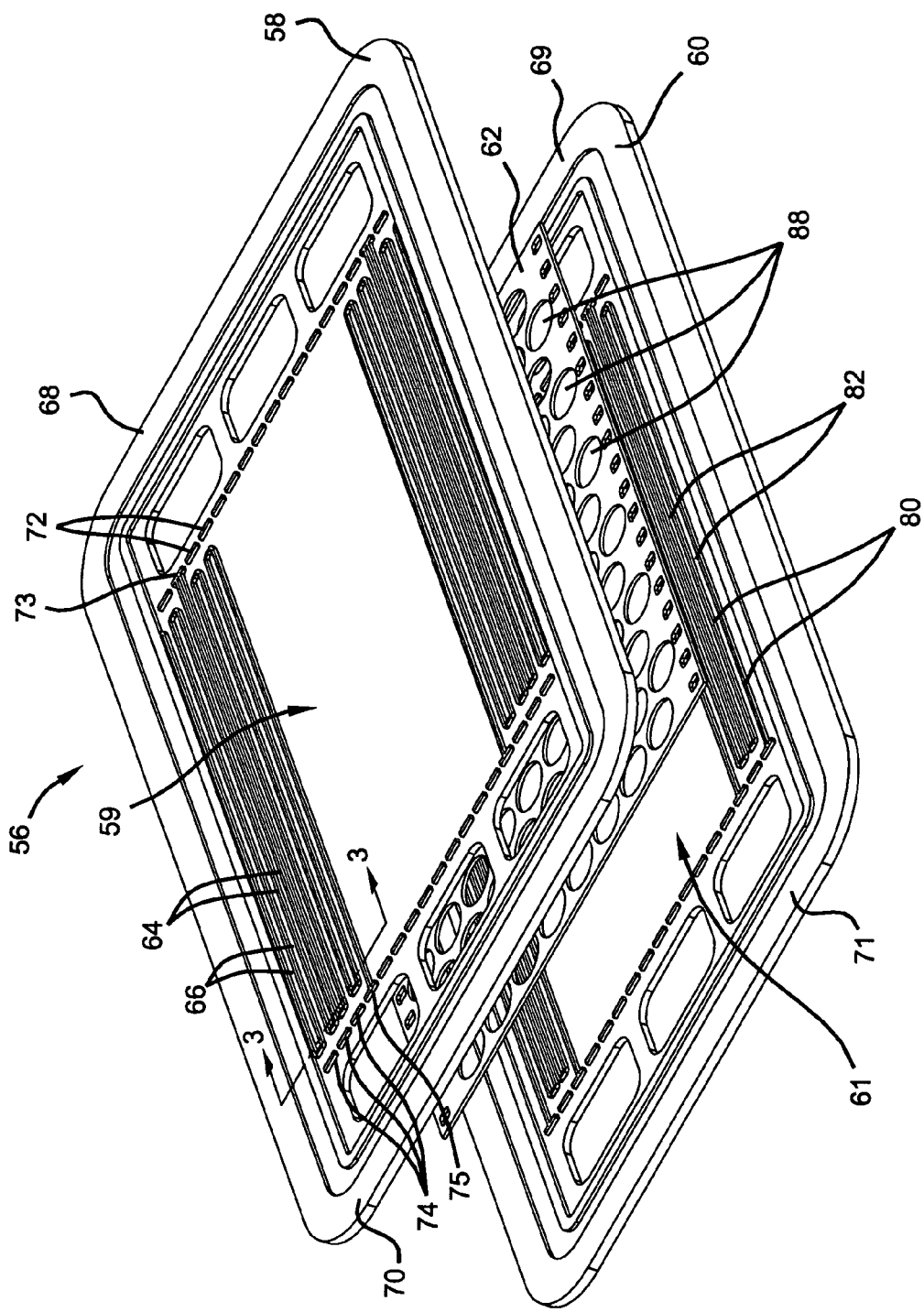
FIG. 2 is an exploded, isometric view of a bipolar plate useful with PEM fuel cell stacks like that illustrated in FIG. 1.

FIG. 2 is an isometric, exploded view of a bipolar plate 56 comprising a first exterior metal sheet 58, a second exterior metal sheet 60, and an interior metal spacer sheet 62 interjacent the first metal sheet 58 and the second metal sheet 60. The exterior metal sheets 58, 60 are made as thin as possible (e.g., about 0.002-0.02 inches thick), which may be formed by stamping, by photo etching (i.e., through a photolithographic mask) or any other conventional process for shaping sheet metal. The external sheet 58 has a first working surface 59 on the outside thereof which confronts a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite paper gas diffusion media (such as 36 or 38 in FIG. 1) which, in turn, press against the MEAs (such as 4 or 6 in FIG. 1, respectively). For drafting simplicity, FIG. 2 depicts only two arrays of lands 64 and grooves 66. In reality, the lands and grooves 64, 66 will cover the entire external surfaces of the metal sheets 58, 60 that engage the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

Figure 3:
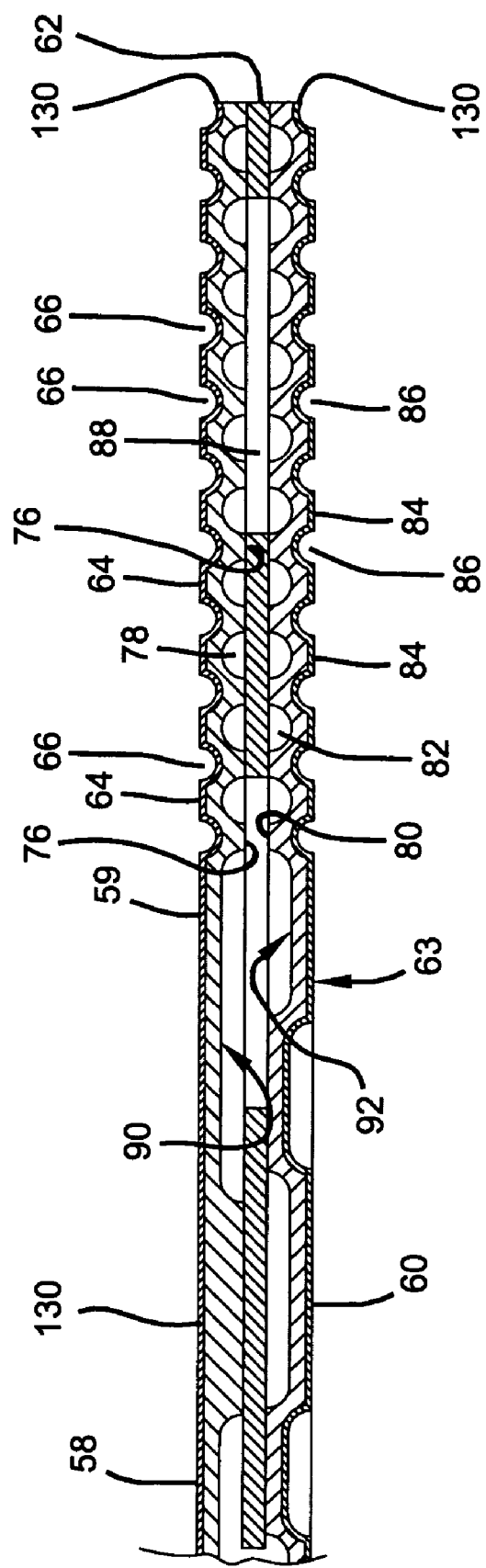
FIG. 3 is a partial cross-sectional view of a preferred embodiment according to the present invention in the direction of 3-3 of FIG. 2.

As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76. Alternatively, the sheet 58 could be flat and the flow field formed in a separate sheet of material. Metal sheet 60 is similar to sheet 58. The internal surface 61 (i.e., coolant side) of sheet 60 is shown in FIG. 2.

In this regard, there is depicted a plurality of ridges 80 defining therebetween a plurality of channels 82 through which coolant flows from one side 69 of the bipolar plate to the other 71. Like sheet 58 and as best shown in FIG. 3, the external side of the sheet 60 has a working surface 63 having a plurality of lands 84 thereon defining a plurality of grooves 86 through which the reactant gases pass. An interior metal spacer sheet 62 is positioned interjacent the exterior sheets 58, 60 and includes a plurality of apertures 88 therein to permit coolant to flow between the channels 82 in sheet 60 and the channels 78 in the sheet 58 thereby breaking laminar boundary layers and affording turbulence which enhances heat exchange with inside surfaces 90, 92 of the exterior sheets 58, 60 respectively.

The spacer sheet 62 is positioned between the first sheet 58 and second sheet 60, where the ridges 76 on the first sheet 58 and the ridges 80 on the second sheet 60 are bonded (e.g. by a bonding layer 85, such as brazement or adhesives) to the spacer sheet 62. As recognized by one of skill in the art, the current collectors of the present invention may vary in design from those described above, such as for example, in the configuration of flow fields, placement and number of fluid delivery manifolds, and the coolant circulation system, however, the function of conductance of electrical current through the surface and body of the current collector functions similarly between all designs.

Typically, based on the geometry, channels with straight flow permit a lower differential pressure across the flow field, compared to complex flow patterns. Although the gas flow field channels 66, 86 may comprise linear rows, certain designs may require non-linear channels, especially where greater fluid turbulence and mixing is necessary. These complex flow fields are typically formed to accommodate ducts for three fluids (hydrogen, air and coolant). The present invention is particularly useful where an element has complex flow field channel 66, 86 patterns (e.g. serpentine flow field patterns having "U-bends" and curves). One aspect of the present invention, is to reduce water accumulation and thus prevent plugging of the gas flow field channels 66, 86.

Figure 4:
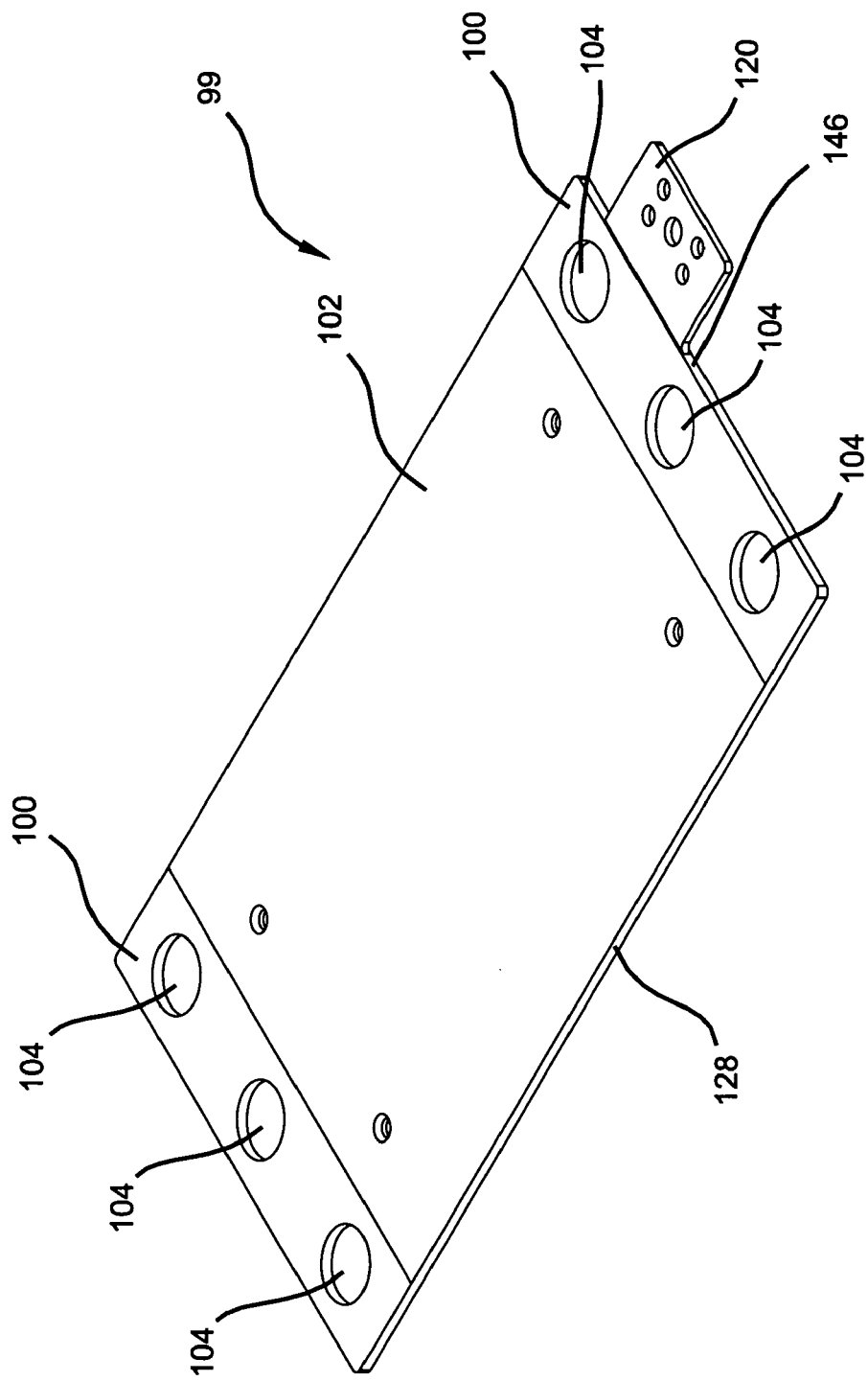
FIG. 4 is an exemplary terminal collector end plate according to an alternate embodiment of the present invention.
Figure 5:
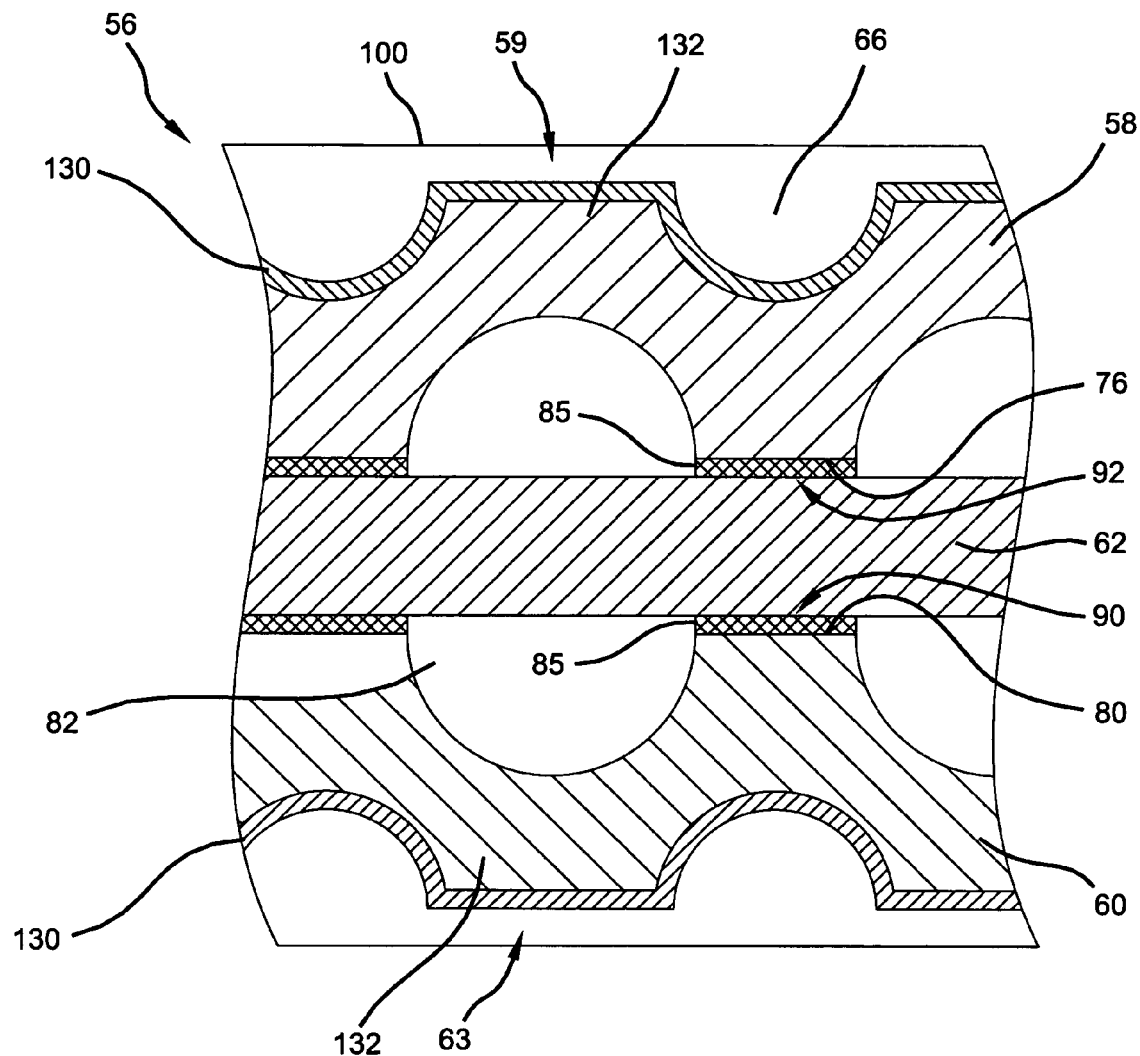
FIG. 5 is a magnified portion of the bipolar plate of FIG. 3 showing a preferred embodiment of the present invention.

The present invention is also applicable to other conductive elements in a fuel cell which contact fluids, such as terminal collector end plates like the exemplary one shown in FIG. 4. A terminal collector end plate 99 (such as 10 or 12 of FIG. 1) has an electrically non-conductive region 100, as well as an electrically conductive region 102. The conductive regions 102 of the terminal plate 99 are typically separated from the non-conductive region 100 by sealing gaskets 33, 35 (FIG. 1). Apertures 104 within the non-conductive region 100 extend through the body, or substrate, 128 of the terminal plate 99 and permit fluid transport (e.g. $H_2$, $O_2$, coolant, anode and cathode effluent) both into and out of the stack during operating conditions. The particular quantity or sequence of the apertures 104 is not limiting, and is merely exemplary as described herein, as numerous configurations are possible as recognized by one of skill in the art. A bipolar plate flow field design may dictate the inlet and outlet aperture 104 configurations and fluid delivery placement. An electrically conductive collector tab 120 can be attached to external leads, facilitating the external collection of current from the stack.

The present invention provides an element, or bipolar plate, that comprises a substrate with an electroconductive polymer deposited thereon, and a method for making the same. The bipolar plate has a fluid flow field formed therein. The electroconductive polymer is preferably deposited on a region of the surface of the substrate by a process of electrochemical polymerization or electropolymerization. Alternate processes include solution casting or screen printing with appropriate solvents. For example, polyaniline can be cast to a substrate from a xylene solution.

The coating reduces liquid accumulation on the region as fluid flows through the flow field, as compared to an uncoated region. Advantageously, the surface free energy of the electrocoated bipolar plate can be adjusted by choosing different counter ions in the conductive polymer and different deposition conditions. So far it has been shown that the surface free energy of the conductive polymer coating can be varied from as low as 30 dynes/cm and up to 72 dynes/cm. In one preferred embodiment, the bipolar plate of the invention has a surface free energy less than 70 dyne/cm, preferably less than 50 dyne/cm. Most preferably, the bipolar plate is provided having a surface free energy of less than 30 dyne/cm, which results in a hydrophobic surface. In another preferred embodiment, the bipolar plate of the invention has a surface free energy more than 50 dyne/cm, preferably more than 65 dyne/cm. Most preferably, the bipolar plate is provided having a surface free energy of more than 72 dyne/cm, which results in a hydrophilic surface. The surface free energy of the bipolar plate of the invention depends on the properties of the electroconductive polymer coating, as discussed further below.

In one preferred embodiment, the electroconductive polymer coating on the bipolar plate is applied by a process of electrochemical polymerization. In the method of the present embodiment, a conductive substrate is used as the working electrode of an electrochemical cell used for electropolymerization. The conductive substrate, or working electrode, is immersed in a solution comprising monomers and electrolyte. After immersing the conductive substrate into the solution, a positive voltage relative to the counter electrode (graphite or noble metal) is applied. The passage of current through such a solution is accompanied by chemical changes at the electrodes. Electrons are lost at the anode via oxidation reactions, and electrons are gained at the cathode where monomers are reduced. Thus, according to the present invention, a positive potential is applied to the working electrode, and a conductive polymer coating is formed thereon by successive anode coupling of monomer radical cations as additional electrons are transferred. Preferred monomers include pyrrole and aniline. In the case of the reaction mechanism for the electropolymerization of pyrrole, for example, the initial reduction of pyrrole at the cathode gives a pyrrole radical cation that ultimately couples with a pyrrole monomer at the anode to form a dimer with the expulsion of two $H^+$. The process is repeated with two $e^-$ and two $H^+$ involved in each addition step, where additional pyrrole radical cations form polypyrrole at the 2,5 positions.

The overall formation of the conductive polymer coating, and the surface properties thereof, are functions of the monomer concentration, electrolyte concentration, and the reaction conditions such as duration of application, pH of the solution, and applied voltage, for example. Thin, integral, uniform films may be produced, where the thickness is determined by the quantity of charge transferred. While the flow of current determines the rate of polymer formation, the total amount of charge transferred will dictate the quantity of polymer produced. For a regional surface film coating, as used herein, the charge governs the overall thickness of the polymer layer. Typically, the films deposited on the hydrophobic surfaces are continuous while the films on the hydrophilic surfaces consist of particles (spheres for polypyrrole; rods for polyaniline).

The formation or growth of the polymer on the substrate also depends upon the polymer's electrical character and corresponding hydrophobic or hydrophilic behavior. The growth of the polymer layer will be self-limiting if the selected polymer is non-conducting. In contrast, the growth of the layer using conductive polymers is virtually unlimited, depending on the selection and electropolymerization conditions.

Suitable monomers include those known to form electroconductive polymers upon polymerization at an anode having a voltage above the oxidation potential of the monomer. Non-limiting examples of such monomers include pyrrole, thiophene, aniline, furan, azulene, carbazole, as well as substituted derivatives of these. Substituted derivatives include 1-methyl pyrrole, and various β-substituted pyrroles, thiophenes, and furans. Non-limiting examples of β-substituted thiophenes include, for example, β-alkyl thiophene, β-bromo thiophene, β-$CH_2CN$ thiophene, and β,β'-dibromothiophene. Similar substitutions may be provided on a furan or pyrrole ring. Furthermore, various alkyl, halo, and other substituted azulenes and carbazoles may be used. Preferred embodiments of the present invention comprise a monomer selected from the group consisting of: pyrrole, aniline, co-polymers and mixtures thereof, which form the electropolymerized coating. Suitable monomers or combinations should be selected based upon the desired degree of hydrophobic or hydrophilic properties required for the specific surface to be coated.

As noted above, the bipolar plate is set up as the working electrode, or anode, during the electropolymerization. Suitable counter-electrodes are also provided. For example, a standard colonel reference electrode (SCE) may be placed close to the working electrode. The bipolar plate may be electrically coupled to a current collector such as a metal foil, or may be connected directly into the circuit by suitable clips, leads, or other devices. The counter-electrodes and the working electrodes are generally immersed in the same electrolyte solution, which further contains suitable concentrations of one or more polymerizable monomers. In a preferred method of the present invention, a region of an electrically conductive surface of the element, or working electrode, contacts the electrolytic solution having the polymerizable monomer. A positive potential is applied to the element relative to the counter-electrode in contact with the electrolytic solution for a duration sufficient to electropolymerize the monomer along the selected region(s) of the substrate.

In general, a wide range of concentrations of the polymerizable monomers can be chosen, depending on the conditions of polymerization and desired characteristics of the resultant polymer coating. It is to be understood that the rate of polymerization and the extent of incorporation of the polymer onto the bipolar plate surface will be determined in part by the concentration of the monomer in the electrolytic solution. Suitable monomeric concentrations include concentrations between about 0.01 M and the upper solubility limit of the monomer. In various embodiments, a maximum concentration of about 1.5 M of the polymerizable monomer is used. In various other embodiments, the monomer concentration is preferably at least about 0.1 M, more preferably at least about 0.5 M, or most preferably is in the range of about 0.5 M to about 1.5 M.

The electropolymerization compartment should contain a suitable level of electrolyte. A wide variety of combinations of electrolytes and deposition conditions may be used, and the concentration of the electrolyte in solution is chosen depending on the desired characteristics of the polymer coating. Preferably, the electrolyte concentration is chosen so that the charge transfer through the electrolyte solution in the cell (by means of the electrolyte molecules) is not rate limiting. As with the monomers, the concentration of the electrolyte may range from about 0.01 M up to its solubility limit in the solvent of the solution. Preferably electrolytes are used in a range between about 0.01 M and about 1.5 M, most preferably from about 0.1 M to about 1.0 M. A preferred solvent comprises water.

The electrolyte may be chosen from molecules or mixtures of molecules that contain a molecular charge and can carry electrons through the solution between the electrodes. Commonly used electrolytes include sulfonic acids and sulfonates such as, without limitation, camphor sulfonic acid, para-toluene sulfonic acid, dodecyl benzene sulfonic acid, sulfuric acid, alizarin red S-monohydrate, and their salts, especially the sodium salts. The structure and concentration of the electrolyte will affect the surface free energy of the coated bipolar plate.

The film, or coating, morphology will depend upon the nature of the electrolyte selected, and on the crystallographic structure of the underlying substrate electrode. The thickness of the coating is generally a function of the duration of the electropolymerization process. Other variables relating to morphology and thickness include, but are not limited to, the speed and the potential used for the deposition, the presence of anions or polyanions and surfactants, the concentration of the selected monomer, and the pH of the overall mixture.

The electroconductive polymer is deposited onto the anode bipolar plate by passing current through the polymerization compartment for a sufficient time to oxidize a sufficient amount of monomer to react to form the electroconductive polymer on the bipolar plate surface. The reaction time for deposition of the polymer will depend on many factors, such as the temperature of the cell, the concentration of monomer and electrolyte in the electrolyte solution, the configuration of the cell, and the desired extent of incorporation of polymer onto the bipolar plate. Typical reaction times range from a few seconds to tens of minutes. In various embodiments, a relatively low deposition current is preferred to achieve a low polymerization rate and a homogeneous coating. It is usually preferred to provide reaction parameters such that the reaction time is suitably short for economic operation of the process, consistent with the formation of a homogeneous conductive polymer coating on the bipolar plate. In a preferred embodiment, cell parameters and reaction conditions are chosen to provide for a reaction time from about 0.5 minutes up to about 30 minutes, preferably from about 1 minute up to 10 minutes. By varying the parameters as discussed, coated bipolar plates are created with regions having a desired surface free energy, which can be varied from 30 to 72 dynes/cm. In one preferred embodiment, the surface energy is less than 50 dyne/cm. In another preferred embodiment, the surface energy is less than or equal to 30 dyne/cm.

Electropolymerization is carried out with the anode held at a voltage above the oxidation potential of the polymerizable monomer. Above that voltage, an applied voltage may be chosen to be consistent with the reaction time, surface free energy, monomer concentration, electrolyte concentration, reaction temperature and other parameters. As a practical matter, the applied voltage should be less than the voltage that would hydrolyze the water in the electrochemical cell. In various embodiments, the applied voltage is in the range from about 0.5 to about 2.5 volts (versus the SCE reference electrode). Various counter electrodes may be used, such as platinum mesh, titanium mesh, and graphite blocks. Electropolymerization of the film, or coating, may be generated either by cycling of the potential at the electrodes or alternatively, by using a fixed potential.

In one method according to the present invention, a process is provided for making the coated element, or bipolar plate. Preferred monomers for the electropolymerization comprise pyrrole and aniline. In this embodiment, a polypyrrole, polyaniline, co-polymer of polypyrrole and polyaniline is deposited onto the surface of the bipolar plate. Generally a small amount of electrolyte is also incorporated into the electrodeposited conductive polymer, which can be used to tailor the conductivity of the polymer coating and the surface free energy of the coated electroconductive polymer. Coated regions of a bipolar plate made by the above-described process can have a lower or higher surface free energy than uncoated regions.

In another embodiment, the coated bipolar plate described above is used in a separator assembly in an electrochemical fuel cell that provides integrated water management. Such water management functions include: moving water away from the wet areas of the cathode side of the fuel cell, where it is generated as a product in the fuel cell electrochemical reaction; preventing water build up in any curves or bends in the flow field by reducing fluid accumulation; and more fully enabling the internal transporting of water to any relatively dry areas along the cathode side.

In a preferred embodiment of the present invention, the coated regions of the bipolar plate establish a conductive path between the MEA and the bipolar plate and have an electrical conductivity between about 50 m$\Omega$-cm$^2$ and about 100 m$\Omega$-cm$^2$ under a compressive force of about 1,350 kPa or greater. In another embodiment, the electrical conductivity will be less than 50 m$\Omega$-cm$^2$ under a similar compressive force.

Selection of the material of construction for an electrically conductive element within a fuel cell, such as bipolar plates or terminal plates, includes weighing such parameters as overall density (mass and volume), electrical contact resistance of the substrate measured at the surface, bulk conductivity, and corrosion and oxidation resistance. Thus, the important considerations for an electrical element include surface and bulk intrinsic conductivity of the material to perform as an electrical current collector, while withstanding the potentially corrosive conditions experienced within the fuel cell. It is preferred that current collectors according to the present invention comprise a conductive metal. Non-limiting examples of metals that could be used as a substrate include aluminum, magnesium, platinum, stainless steel, titanium, a metal alloy and mixtures thereof. Alternatively, select conductive polymer composites could also purportedly be used as a substrate material, given there exists good adhesion between the composite and the selected electroconductive polymer.

Stainless steels rich in chromium (i.e., at least 16% by weight), nickel (i.e., at least 20% by weight), and molybdenum (i.e., at least 3% by weight) are particularly desirable metals for use within a fuel cell, due to their relatively high bulk electrical conductivity and corrosion resistance. It is preferred that the surface of the substrate 58, 60 is clean and substantially free of metal oxides, which are significantly less electrochemically active than the base metal. By substantially free, it is meant that any metal oxides present are removed to the extent metal oxides have a negligible effect on contact resistance and adhesion of the subsequent polymer coating 130, especially in the regions where electrical contact will occur, such as over the lands 64, 84 to minimize electrical resistance. The choice of the appropriate cleaning process or sequence of cleaning processes is selected based upon both the nature of the contaminant and the metal. Any metal oxide on the surface of the substrate may be removed by a variety of suitable processes known in the art, such as cathodic electrolytic cleaning, mechanical abrasion, cleaning the substrate with alkaline cleaners, and etching with acidic solvents or pickle liquors.

Thin stainless steel plates can be used to decrease the volumetric and weight power density of the fuel cell stack. Further, stainless steel materials have relatively high strength, physical durability, adherence to protective coatings, and are less expensive than many other conductive metal alternatives. However, naturally occurring oxide layers at the surface impermissibly increase electrical contact resistance of the substrate, which has previously prevented its independent use as an electrical contact element or current collector. Further many other relatively lightweight metals are susceptible to corrosive attack (e.g. aluminum and titanium). In an $H_2$—$O_2$/air PEM fuel cell environment, the bipolar plates and other contact elements (e.g., end plates) are in constant contact with highly acidic solutions (pH 3-5) containing $F^-$, $SO_4^{2-}$, $SO_3^-$, $HSO_4^-$, $CO_3^{2-}$, and $HCO_3^-$, etc. Moreover, the cathode operates in a highly oxidizing environment, being polarized to a maximum of about +1 V (vs. the normal hydrogen electrode) while being exposed to pressurized air. Finally, the anode is constantly exposed to super atmospheric hydrogen. Hence, contact elements made from metal must be resistant to acids, oxidation, and hydrogen embrittlement in the fuel cell environment. Thus, another aspect of the present invention is that the electroconductive polymer coating according to the present invention used on the bipolar plates and end plates, is corrosion and oxidation resistant, as well as electrically conductive, to promote the power output and lifespan of the fuel cell.

According to a preferred embodiment of the present invention, an electroconductive polymer coating 130 (referring generally to FIGS. 1 through 3 and 5 and 6) is electrochemically deposited along at least one region of the surface 59, 61 of the bipolar plate 56. In one method of the invention, the entire working surface 59,61 of the bipolar plate 58, 60 is coated with a polymer. In an alternate embodiment, a plurality of discrete regions are coated. In certain preferred embodiments, the discrete regions correspond to flow field grooves 66 along the cathode side of the element which are susceptible to liquid accumulation. The plurality of coated regions may comprise the same electroconductive polymer, or may comprise different polymers in different areas/regions. By using different polymers, the surface free energy of the coating may be used to modify the relative hydrophobicity of the coated regions of the surface 59,61. In certain preferred embodiments, a first coating having a first surface free energy is deposited on a first region and a second coating having a second surface free energy is deposited on a second region, wherein the first surface free energy is greater than the second surface free energy.

In certain preferred embodiments, the coating 130 has a gradient, or non-uniform surface free energy along at least one of the one or more coated regions. For example, one coated region can extend from an inlet 73 to an outlet 75 of a flow field (FIG. 2). In a preferred embodiment, the flow field channels 66 have a greater hydrophobicity at the inlets 73 in comparison the outlets 75, thereby drawing accumulated water toward the outlet and preventing water accumulation in the flow field channels 66. Similarly a hydrophilic gradient can be created along a channel length to draw product water towards the outlet and out of the flow field. Additionally, the polymer coating 130 may comprise a plurality of layers (i.e., one or more layers). In other words, this electroconductive coating can also be applied to a preexisting conductive coating, already on the bipolar plate. This could provide a means of further protecting certain parts of the plate from the harsh fuel cell environment. The electroconductive coating is applied to certain areas of the plate to further enhance water management. The remaining areas would not have the additional electroconductive coating, but would still be conductive from the preexisting coating.

In a preferred embodiment, a thickness of a coating 130 may range from about 2 to about 200 μm. As previously discussed, the coating 130 may comprise one or more layers to achieve this thickness. The coating 130 may be deposited on a first region at a first thickness, and on a second region with a second thickness. The coating 130 thickness should be selected to maintain the desired surface free energy while not adding excess material and weight to the fuel cell.

Figure 6:
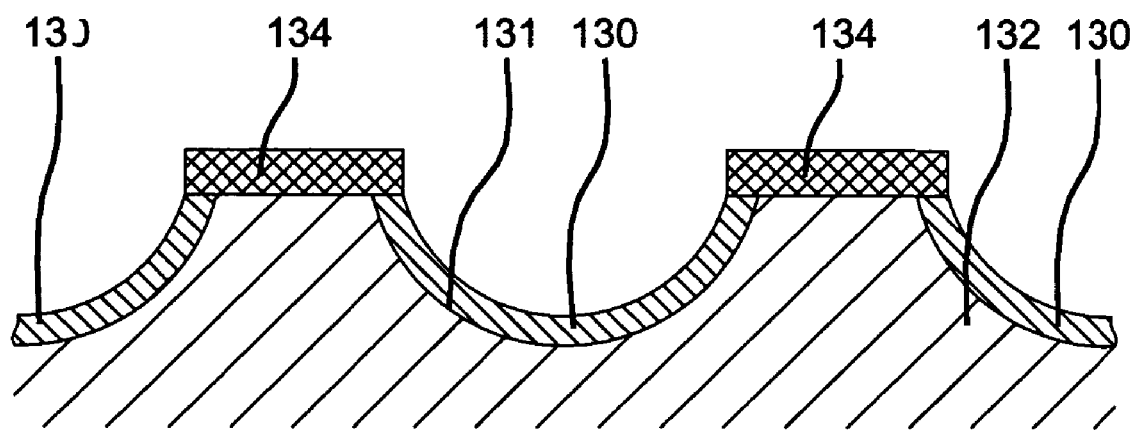
FIG. 6 is an alternate preferred embodiment of the present invention showing a magnified portion of the bipolar plate of FIG. 3.

Since electropolymerization generally occurs only on conductive surfaces, in one embodiment of the present invention, select regions 133 of the conductive substrate element surface 59,61 are masked. The polymer coating 130 is thus applied only to the desired non-masked areas 131, while regions 132 underlying the mask 134 remain uncoated. In a preferred method of the invention, certain select regions, such as lands 64,84 are masked with electrically insulating material 134 prior to the electropolymerization process as shown in FIG. 6. As one skilled in the art can appreciate, various portions of the conductive substrate (e.g., bipolar plate 56) may be masked before the electropolymerization process. Additionally, there may be various iterations of masking and electropolymerization—each with a different polymer. Any number of different polymer coating 130 combinations can be achieved on different areas of the element 56 and hence can create a variety of different surface properties.

As previously discussed, one aspect of the present invention provides electroconductive polymer coatings with different surface free energies on one or more regions of a substrate which serve to reduce and prevent channels from plugging with liquids along the coated regions. Another beneficial aspect of the present invention permits variable surface energies to be used to induce capillary action in the channels, thereby drawing product water from the inlets to the outlets. The inlet regions may be designed with relatively more hydrophobic characteristics while the outlet regions are relatively less hydrophobic. Conversely the inlet regions may be designed to be relatively less hydrophilic while the outlet regions are more hydrophilic.

Another method of varying the surface free energy of these electroconductive polymer coatings with a single substrate is by slowly pulling the substrate (bipolar plates) out of the plating bath and changing the deposition condition (e.g. voltage) accordingly during the electropolymerization process.

Additionally, a hydrophobic coating on a surface with a corresponding decreased surface energy allows only small drops to reside on the channel walls—larger drops which grow get easily sheared away Such smaller droplets create less flow resistance in the channels, and are more easily thawed from a solid state after shut-down conditions, when the fuel cell is shut down below freezing temperatures. Additionally, smaller frozen droplets of liquid have less potential to cause damage in the fuel cell upon expansion during solidification.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically conductive metal element comprising:
   a surface defining a flow field having an inlet area and an outlet area, said flow field constructed and arranged to distribute reactant from said inlet area to said outlet area; and
   an electroconductive polymeric coating overlying at least one region of said surface and extending from said inlet area to said outlet area, said electroconductive coating having a first hydrophobicity at said inlet area and a second hydrophobicity at said outlet area,
   wherein said first hydrophobicity is greater than said second hydrophobicity.

2. The electrically conductive element of claim 1, wherein said coating has a gradient surface free energy extending from said inlet area to said outlet area.

3. The electrically conductive element of claim 1, wherein at least a portion of said coating is hydrophilic.

4. The electrically conductive element of claim 1, wherein said coating overlies substantially the entire surface of the element.

5. The electrically conductive element of claim 1, wherein said coating comprises a plurality of layers.

6. The electrically conductive element of claim 1, wherein a thickness of said coating is between about 2 to about 200 μm.

7. The electrically conductive element of claim 1, wherein a thickness of said coating is substantially uniform over said region.

8. The electrically conductive element of claim 1, wherein a thickness of said coating is non-uniform over said region.

9. The electrically conductive element of claim 1, wherein said region is in contact with a fluid susceptible to accumulation along the surface.

10. The electrically conductive element of claim 1, wherein said electroconductive polymer is selected from the group consisting of: polyaniline, polypyrrole, co-polymers and mixtures thereof.

11. The electrically conductive element of claim 1, wherein said electroconductive polymer comprises polyaniline.

12. The electrically conductive element of claim 1, wherein said electroconductive polymer comprises polypyrrole.

13. The electrically conductive element of claim 1, wherein said electroconductive polymer comprises a co-polymer of polyaniline and polypyrrole.

14. The electrically conductive element of claim 1, wherein the element comprises a material selected from the group consisting of: aluminum, magnesium, platinum, stainless steel, titanium, and mixtures thereof.

15. The electrically conductive element of claim 1, wherein a surface free energy of said coated region of the surface is less than 70 dyne/cm.

16. The electrically conductive element of claim 1, wherein a surface free energy of said coated surface is less than 50 dyne/cm.

17. The electrically conductive element of claim 1, wherein a surface free energy of said coated surface is less than 30 dyne/cm.

18. The electrically conductive element of claim 1, wherein said coated region of the surface is corrosion resistant.

19. An electrically conductive metal element comprising: a surface of the electrically conductive metal element constructed and arranged to distribute reactant gas, and at least one region of the surface having an electroconductive coating deposited over the metal element, said electroconductive coating being electrically conductive and comprising an electroconductive polymer, wherein a first coating is deposited on a first portion of said region having a first surface free energy and a second coating is deposited on a second portion of said region having a second surface free energy, wherein said first surface free energy is greater than said second surface free energy.

20. The electrically conductive element of claim 19, wherein a surface free energy of said coated region of the surface is less than 70 dyne/cm.

21. The electrically conductive element of claim 19, wherein a surface free energy of said coated surface is less than 50 dyne/cm.

22. The electrically conductive element of claim 19, wherein a surface free energy of said coated surface is less than 30 dyne/cm.

* * * * *